June 16, 1953  A. F. KNOBLAUGH  2,641,828

ALIGNING AND FREEING BEARINGS

Filed Jan. 3, 1949

INVENTOR.
ARMAND F. KNOBLAUGH,
BY
ATTORNEYS.

Patented June 16, 1953

2,641,828

UNITED STATES PATENT OFFICE 2,641,828

ALIGNING AND FREEING BEARINGS

Armand F. Knoblaugh, Cincinnati, Ohio, assignor to The Baldwin Company, Cincinnati, Ohio, a corporation of Ohio Application January 3, 1949, Serial No. 68,845

3 Claims. (Cl. 29—149.5)

This invention relates to bearings. More particularly, it pertains to a method of treating bearing assemblies comprised of bearings contained in supporting structures and containing shafts therein, wherein the shafts may be undesirably snug or tight in the bearings, so that the shafts become smoothly operative but not loose in the bearings.

The invention is especially applicable to pin bearings such as are used in pianos in the pivotal connections, known as centers, forming part of the actions of such instruments. For convenience, therefore, I shall describe the invention in that respect. It may, for example, be employed with the bearing materials and assemblies which have been specified in my copending applications Serial No. 20,316 filed April 10, 1948, now Patent No. 2,580,436, and entitled Pin Bearings, Material Therefor, and Method of Making, No. 33,404 filed June 16, 1948, now Patent No. 2,580,437, and entitled Bearings, Bearing Material, and Method of Fabricating Bearings, and No. 68,846 filed January 3, 1949, now Patent No. 2,580,438, and entitled Bearing Assemblies.

One object of the invention is to provide a method of accommodating bearings to their shafts after the bearing structures with the contained shafts have been fabricated, which is economical in time and cost including reduction in precision which would otherwise be required in making the elements for the bearing structures and in forming the structures.

Another object, in keeping with the foregoing object, is to provide a method which does not disturb desired characteristics of bearing structures.

Still another object, conforming to the above objects, is to provide a method of accommodating bearings to shafts in which the performance under the method, for given conditions of the method, is commensurate with the extent to which accommodation is required.

The manner in which the above objects are attained, and the attainment of other objects which will be pointed out later herein or will become apparent to those skilled in the art on reading this specification will now be described in detail, with reference to the accompanying drawings forming a part hereof, wherein.

Briefly, in my invention I employ bearings having coatings or sheaths of thermoplastic material. The coating may be applied to bearing material or bearings as they are inserted in bearing holders or it may be applied to the material aforehand. In either case, the coating or sheath may, if desired, function as an adhesive to retain the bearings in the holders. With the employment of the thermoplastic material, after the bearing structures have been fabricated, including insertion of the shafts, I elevate the temperature of the structures for a limited amount of time which permits a certain amount of flow of the thermoplastic sheaths contained between the bearings and their holders.

If a pair of bearings with a common shaft therein are misalined in a bearing holder, the flow of the thermoplastic sheaths surrounding the bearings under the conditions of elevated temperature, alines the bearings with the shaft, brought about through the forces which the misalined shaft transmits through the bearings to the sheaths. In another particular, especially applicable to resiliently compressible bearings composed of entwined filaments, such as used in piano action centers, if a shaft is tight or too snug in a bearing due to undersize of the bearing hole or oversize of the shaft, the flow of the plastic sheath at elevated temperature brought about by the radial forces which are transmitted to the sheath, accommodates the bearing to the shaft.

After application of the method, the bearing structures are allowed to cool, the thermoplastic sheaths harden as thus altered, and the structures are ready for use. I have found that for a single set of conditions under the method, i. e., one appropriately selected temperature and time, that bearings and shafts are brought substantially to the same degree of accommodation irrespective of initial misalinement or lack of accommodation. This, I believe, is due to the extent of the forces involved, the increased forces of greater misalinement or lack of accommodation causing greater flow of the thermoplastic sheaths.

In this way, my invention is useful in an industrial practice wherein bearing structures in large quantities may be brought to a substantially uniform condition irrespective of various initial conditions. Further, as a result of the invention the amount of precision in making bearing elements and structures may be reduced, the present invention operating as a compensating means. Apparatus for the invention may take the form of an oven maintained at a predetermined elevated temperature in which bearing structures are placed for a predetermined amount of time or through which the structures are transported on conveying apparatus so as to be subjected to the elevated temperature a desired amount of time.

Figure 1:
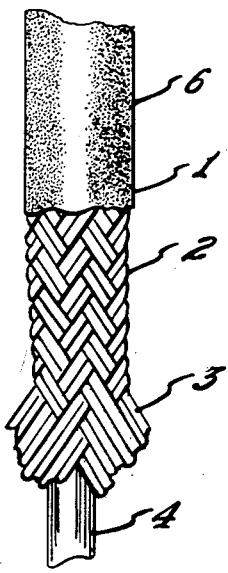
Figure 1 is a fragmentary view of exemplary bearing material.

Since the present invention may operate both to aline a pair of bearings containing a common shaft and to accommodate a shaft to a flexible bearing formed of entwined filaments, it is convenient to display it as applied to piano action centers. Thus, in Figure 1 of the accompanying drawings, bearing material 1 is composed of a tube 2 of nylon filamentary elements 3 in the form of thread or yarn tightly braided on a core wire 4 and enclosed in an adhering cementitious sheath 6 which has hardened thereupon. Preferably, I employ a nitrocellulose cement for the sheath 6, which has thermoplastic properties. The material 1 and its formation have been more completely described in the aforementioned applications, Serial Nos. 33,404 now Patent No. 2,580,437 and 68,846 now Patent No. 2,580,438. The bearing material described in the aforementioned application, Serial No. 20,316 now Patent No. 2,580,436 may also be used.

Figure 2:
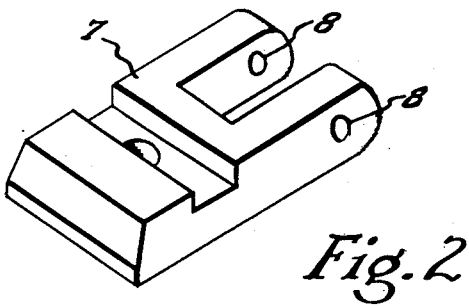
Figure 2 is a perspective view of an exemplary bearing holder.

In Figure 2, a wood bearing holder 7, known as a flange in the piano art, has a bifurcated end containing bearing holes 8 intended to be axially alined. To form bearing assemblies, the material 1 is inserted in the holes 8 to the inner ends thereof and is cleanly severed at the outer ends of the holes from the main body of the material. The portions of core wire 4 remaining within the material in the holes 7 are then driven out. In inserting the material in the holes 8, cement may be applied thereto to attach the bearings to the holder 7, or as an alternative means the cementitious sheath 6 may be partially reactivated by a suitable solvent as the bearing material is inserted in the bearing holder. The bearing forming operations as outlined have been more completely described in the copending patent applications identified above.

Figure 3:
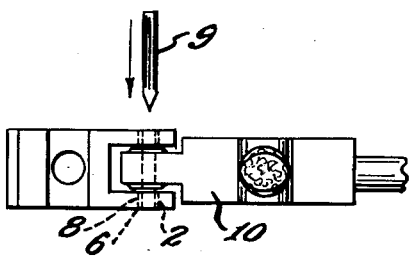
Figure 3 is a plan view of a bearing assembly as a piano action member, comprising a bearing holder such as that of Figure 2 containing bearings derived from material such as shown in Figure 1, being pinned to another piano action member shown partially.

After a sufficient time to permit the bearings to adhere to the holders, the assemblies thus formed are joined to other piano parts to form pivotal connections therewith. Such an operation is illustrated in Figure 3, with the members as joined shown in Figure 4. The smooth metal shaft or center pin 9 is driven as indicated by the arrow in Figure 3 into the two bearings or bushings composed of the braided tubes 2 and their encompassing sheaths 6 in the holder or flange 7, with the end of a hammer butt 10 interposed and containing a hole in which the center pin fits tightly. In a complete upright piano about 330 pivotal connections or centers such as have been described would be employed, with a greater number in a grand piano.

In making bearing structures as above described, the expendable core wire 4 may be .043" diameter, the bearing holes 8 .106" diameter, and the bearing material 1 the same diameter as the bearing holes or perchance .107" diameter since the material is slightly compressible and will enter slightly smaller bearing holes. Corresponding to these, center pins 9 may be .052" diameter. The foregoing recited dimensions are given as exemplary, not limiting my invention.

It will be noted in the above that the core wire 4 is somewhat smaller than a center pin 9. Thus, the center pin would be initially somewhat snug in the bearings derived from the material 1 tightly fabricated on the core 4. I have stated in the aforementioned patent applications that due, I believe, to compressional fatigue of the braid in the bearings and to plastic flow of the sheaths 6, under pressure by the center pin, the centers would become free but firm with the bearings and their corresponding pins in alinement in a satisfactory amount of time, provided the relationship between the core wire and center pin are substantially as described.

I have found that under usual room temperatures, the time required to provide accommodations in the centers may amount to several weeks. While this is satisfactory, it requires in an industrial production of pianos at a high rate, a large inventory of assembled centers requiring appreciable storage space.

However, I have discovered that by elevating the temperature of the assembled centers, the accommodation therein desired may be carried out quite rapidly. If the exemplary centers herein described—wherein the nitrocellulose sheath of the bearings has a wall thickness of a few thousandths of an inch—are subjected to a temperature of about 135 degrees Fahrenheit for one hour, satisfactory accommodation is obtained. Upon cooling, which may be allowed to occur naturally in an open room, the centers are in condition for use.

Figure 4:
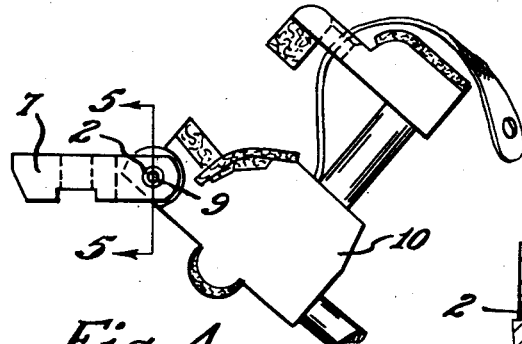
Figure 4 is a side view showing the two action members of Figure 3 pinned together to form a pivotal connection of the two members.

Preferably, I permit about five days to elapse after the centers are assembled—such as the assembly shown in Figure 4 for example—before the heat treating method of the present invention is applied. I believe this permits a certain amount of "flattening" of the interior braid surface of the bearings upon the center pins so as to improve the contact surface therewith. During this waiting period, the thermoplastic sheaths, at room temperature, of course, are relatively unyielding so that the radial forces between the center pins and their enclosing bearing structures may exert themselves upon the bearings.

I have not found that the process described herein disturbs the desired characteristics of piano centers, which characteristics have been fully described in the aforementioned copending patent applications. Nor does it adversely affect other, attendant, parts. Furthermore, I believe— or at least it is my experience from tests which I have carried out—that thermoplastic materials are relatively stable dimensionally (i. e., they do not flow) under shock or momentary forces, whereas they yield as very viscous liquids under continuously applied forces, their viscosity decreasing with increase in temperature. It can be pointed out that the forces upon piano action centers are of shock and intermittent nature in playing a piano.

Figure 5:
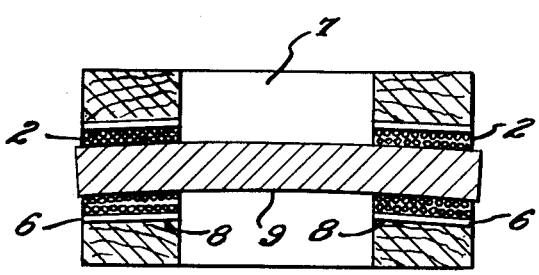
Figure 5 is a cross-sectional view taken in the plane of the line 5—5 of Figure 4, showing distortion before use of the present invention.
Figure 6:
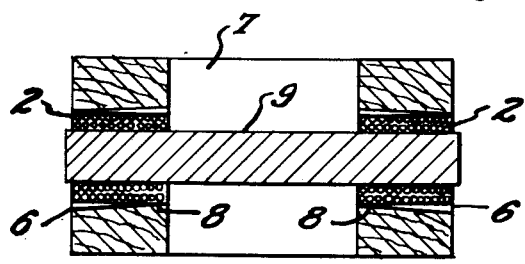
Figure 6 is a cross-sectional view generally similar to that of Figure 5, but showing distortion in a bearing assembly removed upon use of the invention.

Finally, for a diagrammatic illustration of the effects produced by the process of the present invention, I shall refer to Figures 5 and 6 of the accompanying drawings. Both of the figures are sectional views taken in a median plane of the center pin 9 of Figure 4. Figure 5, depicting in exaggeration conditions before the heat treating method herein described, shows bearing holes 8 intended to be axially alined but bored in misalinement, inserted bearings composed of braided tubes 2 and enclosing thermoplastic sheaths 6 consequently in misalinement, and an inserted metal shaft or center pin 9 resiliently bent as a result. Further, it may be supposed that inside diameters of the bearings are somewhat smaller than the center pin so that the pin is tight in the bearings from this cause.

Upon use of the present process, the structure of Figure 5 converts to the desired condition shown in Figure 6. With elevated temperature the cementitious sheaths 6 of thermoplastic substance, flow to altered forms as illustrated, under the influence of flexural and radial forces exerted by the center pin 9, with the result that the bearings become alined with the center pin firm but free therein and with only moderate radial forces between the center pin and the bearing structure.

It will be understood that modifications may be made in my invention without departing from its spirit. Having thus described the invention, those features which I claim as new and novel and which I desire to protect by Letters Patent, comprise:

1. A process of producing piano action bearings which comprises providing a bifurcated wooden bearing holder with a hole in each bifurcation, providing a bearing material in the form of a braided sleeve of textile material, stiffening said sleeve by means of a coating of thermoplastic cementitious substance, inserting portions of said bearing material into said holes from opposite sides of said holder and trimming, inserting a shaft through said sleeve portions and through a member to be pivoted to said holder and located between the bifurcations thereof, and thereafter conditioning the bearing by subjecting the assembly to heat sufficient to soften said cementitious substance, said cementitious substance comprising nitrocellulose and said heat treatment being a heat treatment at substantially 135° F. for substantially one hour.

2. A process of producing bearings which comprises forming a wooden bearing holder having a hole and a bearing material in the form of a braided sleeve of textile material cemented in said hole by means of a thermoplastic cementitious substance, said cementitious substance comprising nitrocellulose, inserting a shaft into said sleeve and into another member to be pivoted to said holder, and thereafter conditioning said bearing by subjecting it to heat sufficient to soften said cementitious substance, said heating being at substantially 135° F. for substantially one hour.

3. A process for accelerating the accommodation of shaft elements to non-uniform bearing elements in the manufacture of pivoted piano action parts, which comprises providing bearing holders containing non-uniform bearings formed of tightly braided sleeves of filamentary material maintained in radially contracted condition by external coatings of thermoplastic cementitious material surrounding said bearing sleeves, inserting into said bearing sleeves the shaft elements with which said bearings are to be used, and thereafter heating the bearing assemblies so formed to an extent and for a length of time sufficient to soften the thermoplastic material surrounding said contracted sleeves, whereby the sleeves are radially expanded and displaced to the extent necessary to accommodate them to the shaft elements with which they are associated.

ARMAND F. KNOBLAUGH.

References Cited in the file of this patent

UNITED STATES PATENTS

| Number | Name | Date |
|---|---|---|
| 937,021 | Cobb | Oct. 12, 1909 |
| 1,104,777 | Cobb | July 28, 1914 |
| 1,369,196 | Semple | Feb. 22, 1921 |
| 1,439,449 | Schloss | Dec. 19, 1922 |
| 1,463,015 | Gray | July 24, 1923 |
| 1,708,141 | Kepler | Apr. 9, 1929 |
| 1,936,863 | Skillman | Nov. 28, 1933 |
| 2,048,247 | Davis | July 21, 1936 |
| 2,129,125 | Geyer | Sept. 6, 1938 |
| 2,181,136 | Knox | Nov. 28, 1939 |
| 2,195,749 | Lignian | Apr. 2, 1940 |
| 2,357,904 | Mulcrone | Sept. 12, 1944 |
| 2,397,626 | Shriver | Apr. 2, 1946 |
| 2,398,364 | Elfstrom | Apr. 16, 1946 |
| 2,450,727 | Haushalter | Oct. 5, 1948 |
| 2,580,436 | Knoblaugh | Jan. 1, 1952 |
| 2,580,437 | Knoblaugh | Jan. 1, 1952 |
| 2,580,438 | Knoblaugh | Jan. 1, 1952 |

FOREIGN PATENTS

| Number | Country | Date |
|---|---|---|
| 451,818 | Great Britain | Aug. 12, 1936 |